United States Patent
Zhou et al.

(10) Patent No.: US 10,198,164 B1
(45) Date of Patent: Feb. 5, 2019

(54) TRIGGERING LOCATION SELECTOR INTERFACE BY CONTINUOUS ZOOMING

(71) Applicant: Google Inc., Mountain View, CA (US)

(72) Inventors: Bailiang Zhou, Balgowlah (AU); Patrick Hofmann, Darlinghurst (AU)

(73) Assignee: Google LLC, Mountain View, CA (US)

( * ) Notice: Subject to any disclaimer, the term of this patent is extended or adjusted under 35 U.S.C. 154(b) by 310 days.

(21) Appl. No.: 14/833,256

(22) Filed: Aug. 31, 2015

Related U.S. Application Data

(60) Provisional application No. 62/041,311, filed on Aug. 25, 2014.

(51) Int. Cl.
| | | |
|---|---|---|
| *G06F 3/0484* | (2013.01) |
| *G06F 17/30* | (2006.01) |
| *G06F 3/0482* | (2013.01) |
| *G06T 3/40* | (2006.01) |

(52) U.S. Cl.
CPC ........ *G06F 3/04845* (2013.01); *G06F 3/0482* (2013.01); *G06F 3/04842* (2013.01); *G06F 17/30241* (2013.01); *G06T 3/40* (2013.01); *G06F 2203/04806* (2013.01); *G06T 2200/24* (2013.01)

(58) Field of Classification Search
CPC ... G06F 2203/048706; G06F 17/30241; G06F 3/04845; G06F 3/04842; G06F 3/0482; G06F 2203/04806; G06T 3/40; G06T 2200/24
See application file for complete search history.

(56) References Cited

U.S. PATENT DOCUMENTS

| | | | | |
|---|---|---|---|---|
| 5,588,100 A | * | 12/1996 | Parker | G06T 11/203 345/442 |
| 6,397,143 B1 | * | 5/2002 | Peschke | G01C 21/20 701/432 |
| 2001/0012017 A1 | * | 8/2001 | Watanabe | G01C 21/367 345/619 |
| 2007/0273712 A1 | * | 11/2007 | O'Mullan | G06F 3/0481 345/650 |
| 2009/0049408 A1 | * | 2/2009 | Naaman | G06F 3/0482 715/835 |
| 2010/0302281 A1 | | 12/2010 | Kim | |
| 2010/0315438 A1 | | 12/2010 | Horodezky et al. | |

(Continued)

*Primary Examiner* — William L Bashore
*Assistant Examiner* — Daniel W Parcher
(74) *Attorney, Agent, or Firm* — Dority & Manning, P.A.

(57) ABSTRACT

Systems and methods for displaying imagery of a geographic area are provided. More particularly, a location selector interface element can be displayed in conjunction with the imagery when a continuous zoom event is detected. In response to the continuous zoom event, the location selector interface element can be displayed in conjunction with, for instance, a zoom interface for zooming the imagery. The location selector interface element can include a plurality of geographic labels. Each geographic label can be associated with a different zoom level of the imagery. Each geographic label can provide a description of a geographic area corresponding to the zoom level associated with the geographic label. A user can interact with the location selector interface element to select a desired zoom level for viewing the imagery. In response to the user interaction, the imagery can be zoomed to the zoom level corresponding to the selected geographic label.

20 Claims, 6 Drawing Sheets

(56) References Cited

U.S. PATENT DOCUMENTS

| | | | |
|---|---|---|---|
| 2012/0042282 A1 | 2/2012 | Wong | |
| 2012/0271877 A1* | 10/2012 | Nicks | H04L 61/3025 709/203 |
| 2014/0181673 A1* | 6/2014 | Work | G06F 3/0484 715/729 |
| 2014/0365935 A1* | 12/2014 | Moha | G06F 3/04815 715/769 |
| 2015/0130792 A1* | 5/2015 | Kunen | G06T 17/05 345/419 |
| 2016/0057595 A1* | 2/2016 | Ahmed | H04W 4/02 455/404.1 |

\* cited by examiner

TRIGGERING LOCATION SELECTOR INTERFACE BY CONTINUOUS ZOOMING

PRIORITY CLAIM

This application claims the benefit of priority of U.S. Provisional Patent Application Ser. No. 62/041,311, filed Aug. 25, 2014, entitled "Triggering Location Selector by Continuous Zooming," which is incorporated by reference herein for all purposes.

FIELD

The present disclosure relates generally to geographic information systems and, more particularly to interfaces for navigating imagery of geographic areas provided by geographic information systems.

BACKGROUND

Geographic information systems provide for the archiving, retrieving, and manipulating of data that has been stored and indexed according to geographic coordinates of its elements. Geographic information systems and other services can allow a user to view geographic imagery associated with an object or location of interest. For instance, a user may request imagery associated with a particular store, location, landmark, etc. The geographic information system can provide geographic imagery depicting the object or location of interest in response to the request to the user.

Geographic information systems can offer imagery of geographic regions of interest in a variety of different formats and from a variety of different view perspectives. For instance, geographic imagery can be provided as map imagery, satellite imagery, aerial imagery, interactive panoramic imagery presented from a perspective at or near ground level, and other imagery. Some geographic information systems provide a user interface with navigation controls for navigating cities, neighborhoods, geographic areas and other terrain in two or three dimensions. The navigation controls can enable users to tilt, pan, rotate, zoom, and activate a virtual camera to obtain views of terrain, buildings, and other objects from different perspectives at a geographic area of interest.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of displaying imagery of a geographic area. The method includes providing for display, by one or more computing devices, imagery of a geographic area at a first zoom level and detecting, by the one or more computing devices, a continuous zoom event. In response to detecting the continuous zoom event, the method includes providing for display, by the one or more computing devices, an interface element. The interface element includes a plurality of geographic labels. Each geographic label is associated with a different zoom level of the imagery. Each geographic label can provide a description of a geographic area corresponding to the zoom level associated with the geographic label. The method further includes receiving, by the one or more computing devices, data indicative of a user interaction selecting one of the plurality of geographic labels in the interface element as a selected geographic label. In response to receiving the data indicative of the user interaction with the interface element, the method includes zooming, by the one or more computing devices, the imagery of the geographic area to a second zoom level corresponding to the selected geographic label.

Other example aspects of the present disclosure are directed to systems, apparatus, tangible, non-transitory computer-readable media, user interfaces, memory devices, and electronic devices for displaying imagery of a geographic area.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
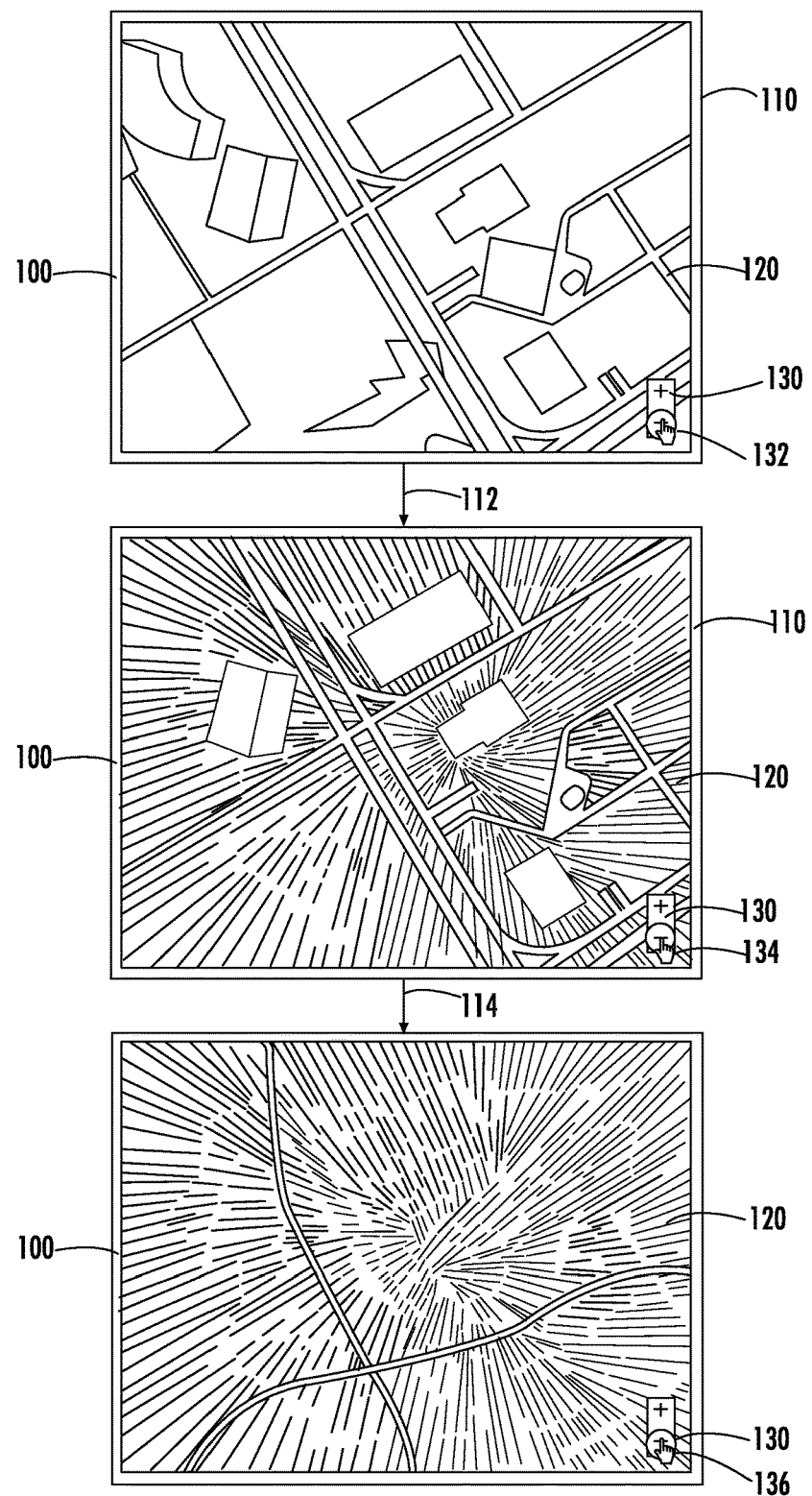
FIG. 1 depicts an example continuous zooming event according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure are directed to systems and methods for displaying geographic imagery provided, for instance, by a geographic information system, such as a mapping service or a virtual globe application. Geographic information systems and other services can allow a user to navigate and view imagery of a geographic area. Users can navigate the imagery by panning, tilting, and/or zooming the imagery using various user interface tools to view the imagery from a variety of different perspectives.

For example, a user can zoom in and/or zoom out the imagery to a desired view of the geographic area by interacting with a zooming button or other zoom interface. Every time the user interacts with (e.g. clicks or taps) the zooming button, the imagery can zoom in or zoom out for one or more zoom levels and the scale of the imagery (e.g. map imagery) can be adjusted accordingly. In certain cases, a user may have to interact with the zoom interface multiple times to reach a desired view of the imagery. This can be a tedious experience for the user. More particularly, each time the user interacts with the zoom interface, the imagery of the geographic area for each corresponding zoom level has to be updated. This can take time as updating the imagery can require connecting to a server, requesting data objects (e.g. tile data objects), and rendering the data objects. In addition, a user may have to read the imagery to find labels to determine the current viewpoint of the imagery during zooming of the imagery. For example, if the user's current viewpoint is California and the user would like to view imagery of downtown San Jose, the user may have to examine the imagery each time the imagery is zoomed to determine if there is a label on the imagery indicative of "San Jose" to confirm that the user is looking from the desired viewpoint.

According to example aspects of the present disclosure, an interface is provided for zooming map imagery that assists a user in finding a desired location quickly without requiring the fetching and rendering of unnecessary data objects for updating the imagery. More particularly, a location selector interface element can be displayed in conjunction with the imagery when a continuous zoom event is detected. A continuous zoom event can occur when multiple zoom requests are received without interruption over a defined time period. For instance, a continuous zoom event can be detected when data indicative of three or more zoom requests is received over a time period of five seconds or less.

In response to the continuous zoom event, the location selector interface element can be displayed in conjunction with a zoom interface for zooming the imagery. For instance, the location selector interface element can be displayed adjacent to the zoom interface. The location selector interface element can include a plurality of geographic labels. Each geographic label can be associated with a different zoom level of the imagery. Each geographic label can provide a description of a geographic area corresponding to the zoom level associated with the geographic label. For instance, a geographic label "California" can be descriptive of a zoom level of the imagery that allows the user to view imagery of the entire state of California. A geographic label "San Jose" can be descriptive of a zoom level of the imagery that allows the user to view imagery of San Jose.

According to particular aspects of the present disclosure, the plurality of geographic labels are identified for inclusion in the location selector interface element based at least in part data indicative of user intentions, such as data indicative of a current view of the imagery as well as a zoom direction associated with a user request to zoom the imagery. For instance, if a user requests to zoom in imagery from a view of the state of California to a middle part of the state, the system can identify geographic labels associated with locations in the middle part of the state for inclusion in the location selector interface element. For instance, "San Francisco," "San Jose", and "Oakland" can be selected for inclusion in the location selector interface element.

A user can interact with the location selector interface element to select a desired zoom level for viewing the imagery. For instance, a user can interact with (e.g. click or tap) a geographic label to select the geographic label as a selected geographic label. In response to the user interaction, the imagery can be zoomed to the zoom level corresponding to the selected geographic label. In this way, the systems and methods of the present disclosure can have a technical effect of providing imagery for display on one or more computing devices such that a user can easily and quickly navigate to desired views of the imagery without having to fetch or render unnecessary data objects (e.g. image tiles) associated with other views of the imagery.

Example User Interfaces for Displaying Imagery of a Geographic Area

Figure 2:
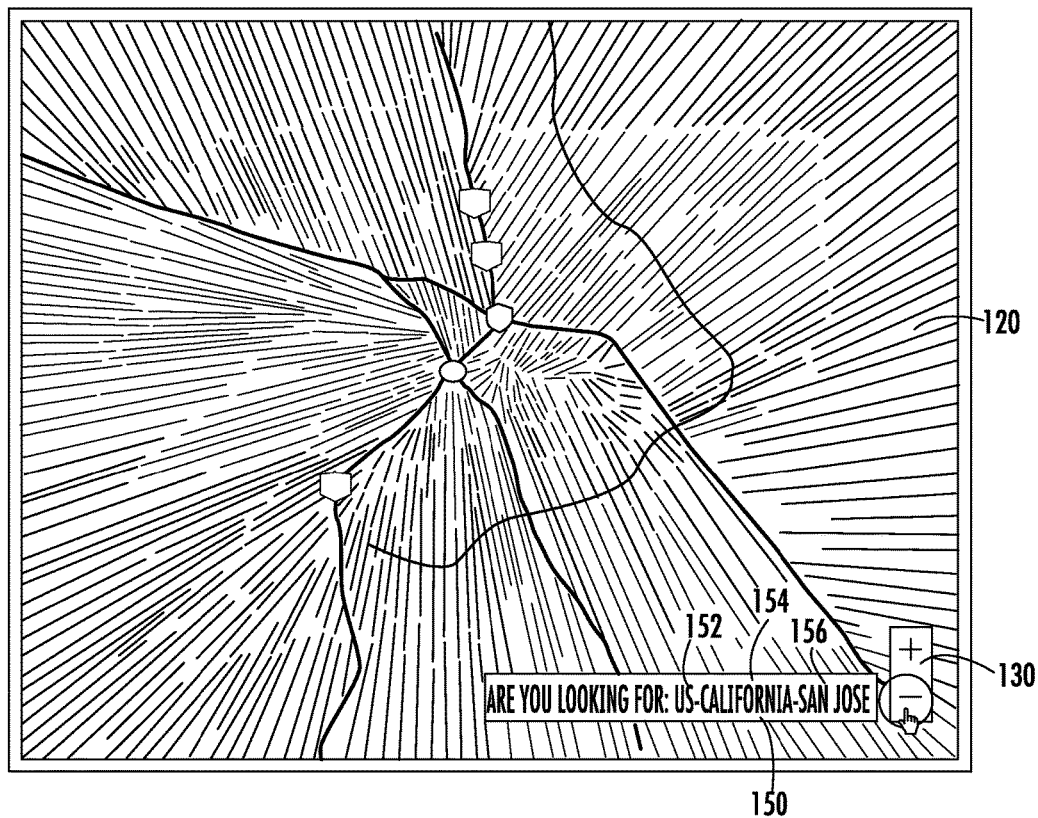
FIG. 2 depicts an example interface element for zooming imagery according to example aspects of the present disclosure.
Figure 3:
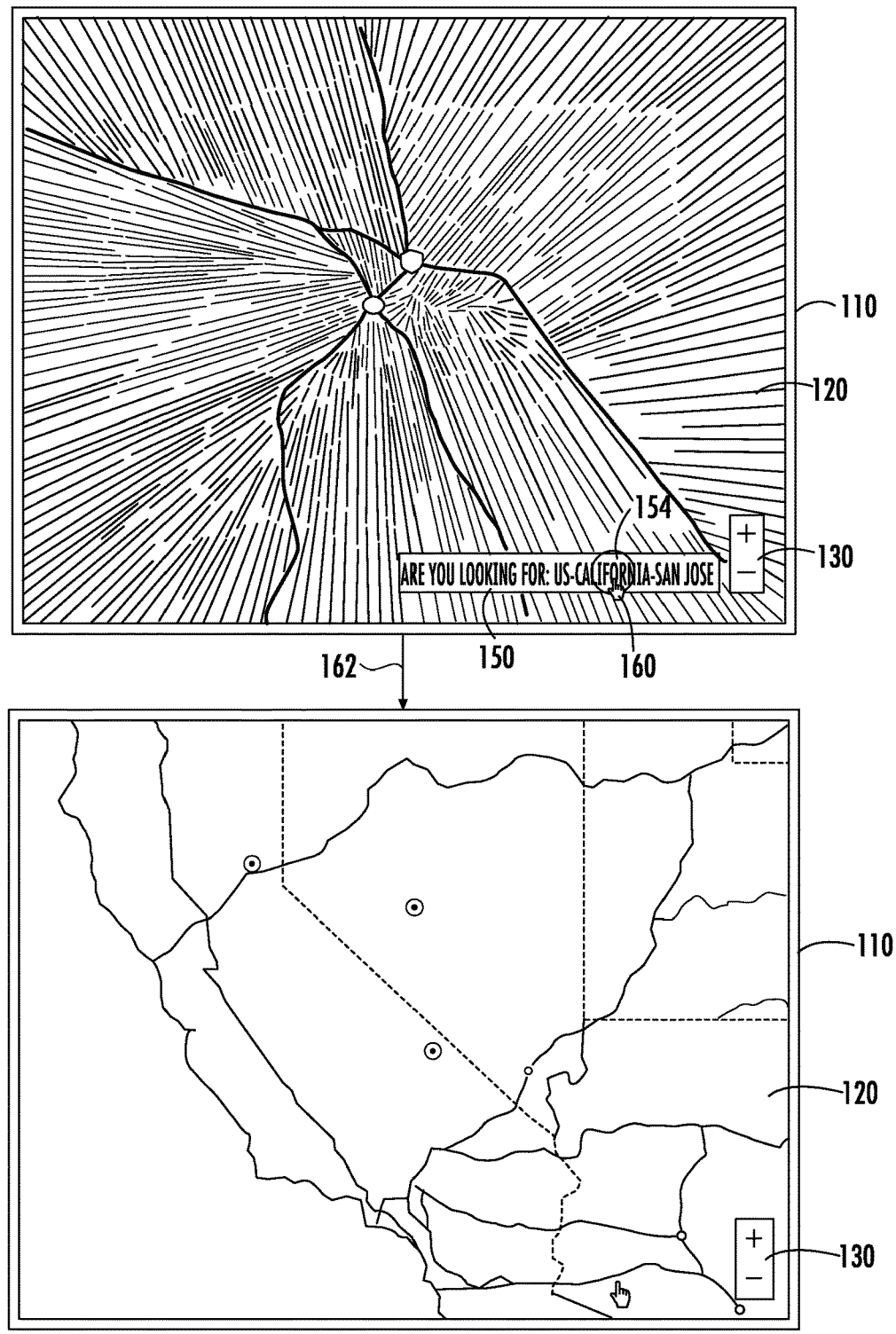
FIG. 3 depicts the example zooming of imagery using the interface element according to example aspects of the present disclosure.

FIGS. 1-3 depict an example user interface 100 for navigating imagery of a geographic area according to example aspects of the present disclosure. The user interface 100 can be implemented on one or more computing devices 110 and can be provided for display on a display device associated with the one or more computing devices 110. The one or more computing devices 110 can include a laptop, desktop, tablet, smartphone, mobile device, PDA, display with one or more processors, smart watch, wearable computing device, navigation system (e.g. an automobile navigation system), or other suitable computing device.

In particular implementations, the user interface 100 can allow a user to interact with a geographic information system, such as a mapping service or virtual globe application. The geographic information system can be hosted on a server (e.g. a web server) in communication with the one or more computing devices 110 over a network, such as the Internet. The geographic information system can provide interactive imagery 120 of a geographic area for navigation and viewing by a user via the user interface 100. The imagery 120 of the geographic area can be indexed and stored according to geographic coordinates. A user can navigate the imagery 120 using various navigation controls that enable the user to tilt, pan, rotate, and/or zoom the imagery to obtain views of the geographic area from various different perspectives.

FIG. 1 depicts the example display of imagery 120 of a geographic area in user interface 100 while zooming the imagery 120 according to a continuous zoom event. As shown, the imagery 120 of FIG. 1 is map imagery. The imagery 120 can be other imagery of a geographic area, such as satellite imagery, aerial imagery, interactive panoramic imagery presented from a perspective at or near ground level, imagery associated with a three-dimensional model, or other suitable imagery.

The user interface 100 includes an example zooming interface 130. The example zooming interface 130 includes an interface element that has a "−" button and a "+" button. A user can interact with the "−" button to zoom the imagery in a first zoom direction to more zoomed out zoom levels. A user can interact with the "+" button to zoom the imagery in a second zoom direction to more zoomed in zoom levels.

A continuous zoom event can occur, for instance, when a user requests to zoom the imagery in the same zoom direction multiple times without interruption within a defined time period. In the example of FIG. 1, a user can request to zoom the imagery with a user interaction 132 (e.g. a click or tap) with the zooming interface 130. In response to the user interaction 132, the imagery 120 can begin to transition to a more zoomed out zoom level as indicated by arrow 112. As the imagery 120 is transitioning to the more zoomed out zoom level and prior to fully rendering the updated imagery associated with the more zoomed out zoom level, a user can again request to zoom the imagery with a user interaction 134 with the zooming interface. In response to the request, the imagery 120 can further transition to an even more zoomed out zoom level as indicated by arrow 114. As the imagery 120 is transitioning to the even more zoomed out zoom level and prior to fully rendering the updated imagery associated with the even more zoomed out zoom level, a user can again request to zoom the imagery with a user interaction 136 with the zooming interface. A continuous zoom event can be detected based at least in part on the multiple, repeated user interactions with the zooming interface 130 demonstrated in FIG. 1. In response to the continuous zoom event, a location selector interface element can be displayed in the user interface 100.

FIG. 2 depicts an example location selector interface element 150 that can be displayed in conjunction with the imagery 120 in response to detecting a continuous zoom event. The location selector interface element 150 can be hidden from view prior to detecting the continuous zoom event to preserve screen space on a display device, such as a display device with limited screen space (e.g. a smartphone, tablet, wearable computing device, etc.).

The location selector interface element 150 shown in FIG. 2 includes a plurality of geographic labels, in this case a first geographic label 152, a second geographic label 154, and a third geographic label 156. More or fewer geographic labels can be included in the location selector interface element 150 without deviating from the scope of the present disclosure. In particular implementations, the location selector interface element 150 can also include a textual descriptor of the functionality of the location selector interface element. In the example location selector interface element 150 of FIG. 2, the textual descriptor includes "Are you looking for:"

Each geographic label in the location selector interface element 150 can be associated with a different specific zoom level of the imagery 120 and can provide a description of a geographic area corresponding to zoom level. For instance, the first geographic label 152 includes a textual description "US" to describe a zoom level that views the entire United States. The second geographic label 154 includes a textual description "California" to describe a zoom level that views the entire state of California. The third geographic label 156 includes a textual description "San Jose" to describe a zoom level that views the entire city of San Jose. Other descriptors indicative of the geographic area corresponding to the zoom levels associated with the geographic labels can be used without deviating from the scope of the present disclosure. The geographic labels can allow a user to select a particular zoom level associated with a desired view without having to continuous scan the imagery 120 while zooming for labels indicative of the current view.

According to particular aspects of the present disclosure, different geographic labels can be identified for inclusion in the location selector interface element 150 based on data indicative of user intentions while zooming the imagery. More particularly, data indicative of a current view of the imagery as well as a zoom direction (e.g. zooming in or zooming out) associated with the continuous zoom event can be used to identify candidate geographic labels for inclusion in the location selector interface element 150. The candidate geographic labels can be scored or ranked based at least in part on various factors, such as user browsing history, user location, user search history, popular views, data indicative of point of interest importance, etc. The candidate geographic labels with the highest scores or ranks can be selected for inclusion in the location selector interface element 150.

Various embodiments discussed herein may access and analyze personal information about users, or make use of personal information, such as historical location history, user device location information, user browsing history, and other information. In situations in which the systems and methods discussed herein access and analyze information about users, or make use of such information, the users may be provided with an opportunity to control whether programs or features collect the information and to control whether and/or how to receive content from the system or other application. In certain cases, no such information or data is collected or used until the user has been provided meaningful notice of what information is to be collected and how the information is used. The information may not be collected or used unless the user provides consent, which can be revoked or modified by the user at any time. Thus, the user can have control over how such information is collected and used by the application or system. In addition, certain information or data can be treated in one or more ways before it is stored or used, so that personally identifiable information is removed. For example, a user's identity may be treated so that no personally identifiable information can be determined for the user.

FIG. 3 depicts the example zooming of imagery 120 upon user interaction with the location selector interface element 150. More particularly, data indicative of a user interaction 160 with the geographic label 154 of the location selector interface element can be used to select geographic label 154 as a selected geographic label. The imagery 120 can then zoom to the zoom level associated with the selected geographic label as demonstrated by arrow 162. In the example of FIG. 3, a user interaction with a geographic label 154 corresponding to a zoom level associated with "California" results in the display of imagery 120 at a zoom level depicting California.

Figure 4:
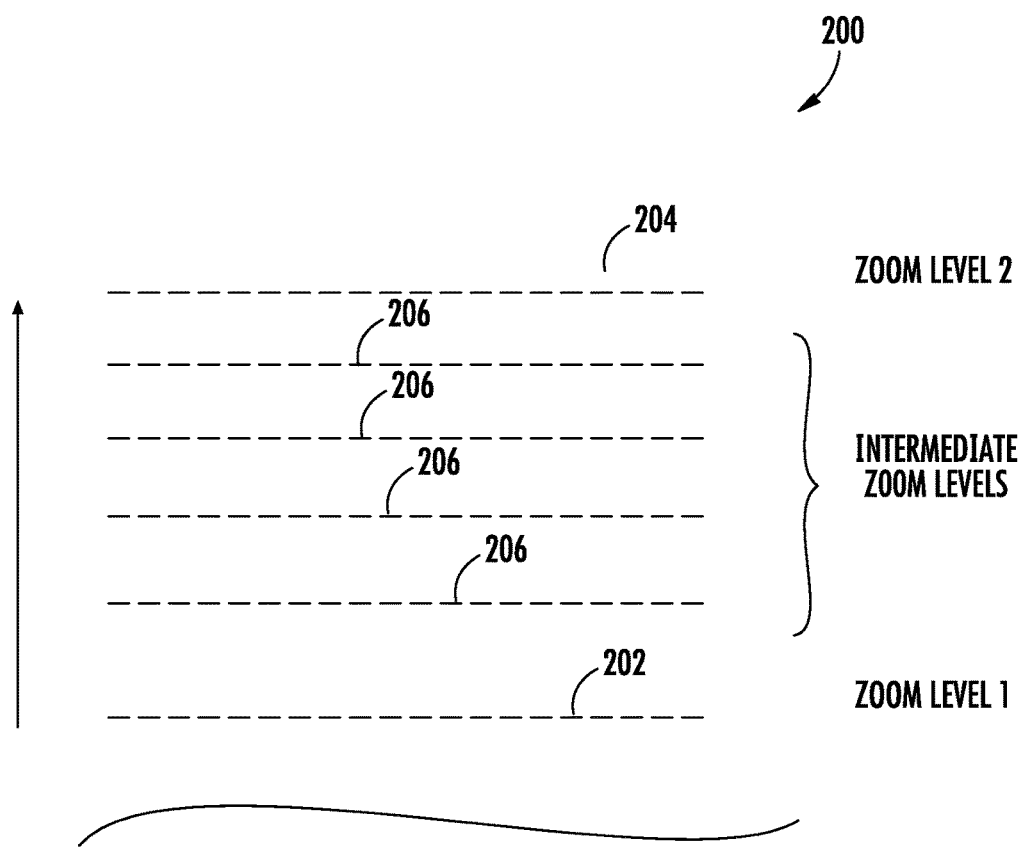
FIG. 4 depicts a representation of example zooming of imagery using the interface element according to example aspects of the present disclosure.

The location selector interface element 150 can have the technical effect of allowing a user to easily navigate to various zoom levels without having to fetch and render data objects associated with intermediate zoom levels. FIG. 4 depicts a representation 200 of zooming imagery using a location selector interface element according to example aspects of the present disclosure. For instance, imagery associated with a first zoom level 202 can be provided for display in a user interface. Upon the occurrence of a continuous zoom event, a location selector interface element can be provided for display in the user interface. The user can select a geographic label corresponding to a second zoom level 204 in the location selector interface element. As shown in FIG. 4, the second zoom level 204 can be separated from the first zoom level 202 by one or more intermediate zoom levels 206. During the zooming of the imagery to the second zoom level 204, one or more data objects (e.g. image tiles) associated with the intermediate zoom levels may not be rendered. Accordingly, a faster transition can be provided between the first zoom level 202 and the second zoom level 204, enhancing the user experience.

Example Methods for Displaying Imagery of a Geographic Area

Figure 5:
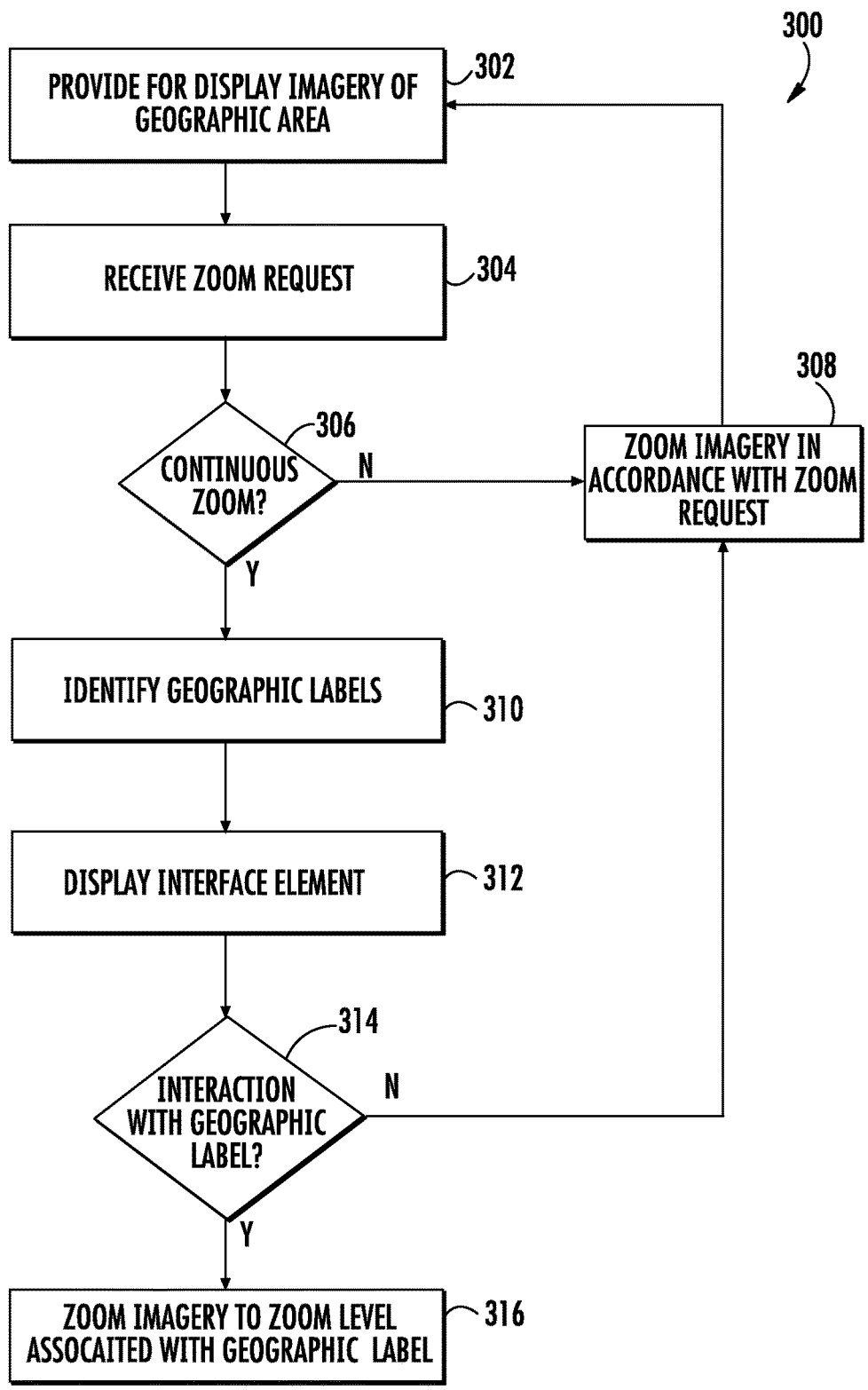
FIG. 5 depicts a flow diagram of an example method according to example aspects of the present disclosure.

FIG. 5 depicts a flow diagram of an example method (300) for displaying imagery of a geographic area according to example embodiments of the present disclosure. The method (300) can be implemented by one or more computing devices, such as one or more of the computing devices depicted in FIG. 6. In addition, FIG. 5 depicts steps performed in a particular order for purposes of illustration and discussion. Those of ordinary skill in the art, using the disclosures provided herein, should understand that the steps of any of the methods disclosed herein can be omitted, rearranged, expanded, adapted, and/or modified in various ways without deviating from the scope of the present disclosure.

At (302), the method includes providing for display, by one or more computing devices, imagery of a geographic area at a first zoom level. For instance, data objects (e.g. tile data objects) associated with the imagery of the geographic area can be provided for display on a display device. The imagery can include map imagery, satellite imagery, aerial imagery, interactive panoramic imagery presented from a perspective at or near ground level, and other imagery.

At (304), the method includes receiving data indicative of one or more zoom requests. A zoom request can be a request to navigate the imagery to a different zoom level. The data indicative of the zoom request can include data indicative of a user interaction with a zoom interface that is presented in conjunction with the imagery. The zoom interface can allow users to zoom and/or otherwise navigate the imagery. Other data indicative of zoom requests can include user inputs or gestures requesting to zoom imagery. For instance, the data indicative of a zoom request can include data associated with one or more touch gestures (e.g. a pinch gesture) on a touchscreen or touchpad used to zoom imagery.

At (306), the method can detect whether a continuous zoom event has occurred. A continuous zoom event can occur when a user provides multiple zoom requests over a time period. For example, a continuous zoom event can be detected when data indicative of a plurality of user interactions with a zoom interface are received over a given time period. As another example, a continuous zoom event can be detected when data indicative of a plurality of user requests to zoom (e.g. via user inputs or gestures) the imagery are received over a given time period. The time period can be specified to be any suitable time period. For instance, in one embodiment, a continuous zoom event can occur when data indicative of three or more zoom requests is received over a time period of five seconds or less.

When a continuous zoom event is detected, the method triggers the display of a location selector interface element as will be discussed in more detail below. Otherwise the method proceeds to zoom the imagery in accordance with the data indicative of the zoom request (308). For instance, the imagery can be zoomed in or zoomed out one or more zoom levels for each zoom request.

When a continuous zoom event is detected, the method can first identify geographic labels for inclusion in a location selector interface element (310). More particularly, a location selector interface element according to example aspects of the present disclosure can include a plurality of geographic labels. Each of the geographic labels can be associated with a particular zoom level and can provide a description of the geographic area corresponding to the zoom level.

The geographic labels can be identified for inclusion in the location selector interface element based on data indicative of user intentions so that the location selector interface element provides a convenient tool for zooming to desired views of the imagery. In one particular example embodiment, the geographic labels are identified based at least in part on a zoom direction associated with the continuous zoom event. For instance, if the continuous zoom event is associated with zooming out the imagery, one or more geographic labels associated with more zoomed out views can be identified for inclusion in the location selector interface element. If the continuous zoom event is associated with zooming in the imagery, one or more geographic labels associated with more zoomed in views can be identified for inclusion in the location selector interface element.

A plurality of candidate geographic labels can be identified based at least in part on a current view of the imagery and a zoom direction associated with the continuous zoom event. The candidate geographic labels can be scored or ranked based on various factors or signals, such as data indicative of user preferences, user browsing history, user location, point of interest/landmark importance, historical usage, and other factors. One or more of the candidate geographic labels associated with the highest rank or the highest score can be identified for inclusion in the location selector interface element.

At (312), the location selector interface element is provided for display, for instance, on a display device. For instance, the location selector interface element is provided for display in conjunction with the imagery of the geographic area in a user interface, such as adjacent to a zooming interface for zooming the imagery. The location selector interface element can include geographic labels identified for inclusion in the location selector interface element.

At (314) it is determined whether data indicative of a user interaction with a geographic label in the location selector interface element is received. If so, the method zooms the imagery to the zoom level corresponding to the geographic label selected by the user via the user interaction (316). Otherwise, the method continues to zoom imagery in accordance with the zoom request (308).

Example Computing Systems for Displaying Imagery of a Geographic Area

Figure 6:
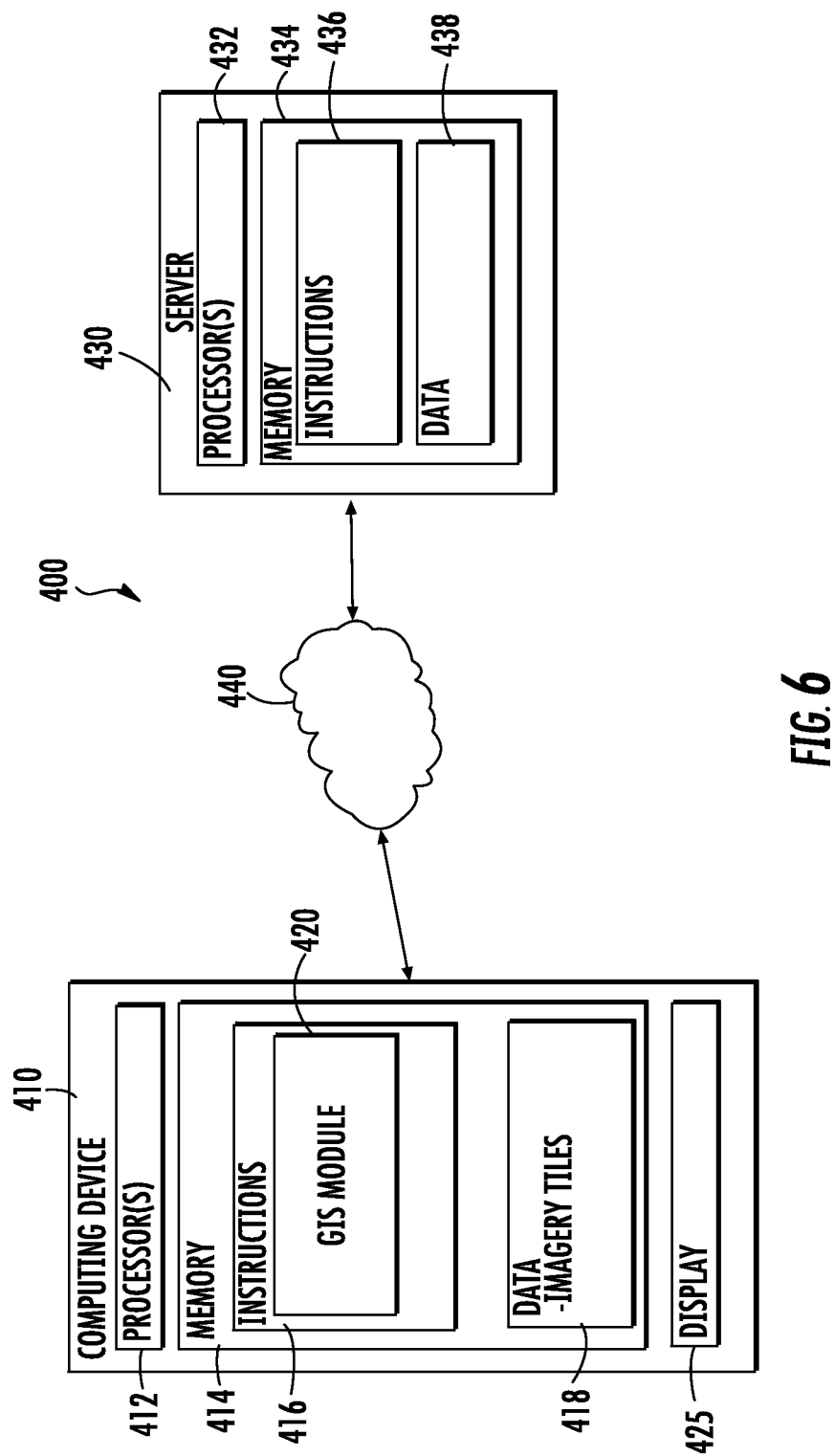
FIG. 6 depicts an example system according to example aspects of the present disclosure.

FIG. 6 depicts a computing system 400 that can be used to implement the methods and systems for displaying imagery of geographic areas according to example embodiments of the present disclosure. The system 400 can be implemented using a client-server architecture that includes a computing device 410 that can communicate with one or more servers 430 (e.g. web servers) over a network 440. The system 400 can be implemented using other suitable architectures, such as a single computing device.

The system can include a computing device 410. The computing device 410 can be any suitable type of computing device, such as a general purpose computer, special purpose computer, navigation system (e.g. an automobile navigation system), laptop, desktop, mobile device, smartphone, tablet, wearable computing device, a display with one or more processors, or other suitable computing device. The computing device 410 can include one or more processor(s) 412 and one or more memory devices 414.

The one or more processor(s) 412 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 414 can include one or more computer-readable media, including, but not limited to, non-transitory computer-readable media, RAM, ROM, hard drives, flash drives, or other memory devices.

The one or more memory devices 414 store information accessible by the one or more processors 412, including instructions 416 that can be executed by the one or more processors 412. For instance, the memory devices 414 can store instructions 416 for implementing a geographic information system (GIS) module 420 configured to allow a user to interact with a geographic information system hosted, for instance, by the server 430. The one or more memory devices 414 can also include data 418 that can be retrieved, manipulated, created, or stored by the one or more processors 412. The data 418 can include, for instance, imagery tile data objects associated with varying zoom levels of geographic imagery.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, flash drive, hard disk or optical or magnetic media. When software is used, any suitable programming language or platform can be used to implement the module.

The computing device 410 can include various input/output devices for providing and receiving information from a user, such as a touch screen, touch pad, data entry keys, speakers, and/or a microphone suitable for voice recognition. For instance, the computing device 410 can have a display 425 for providing imagery of a geographic area to a user.

The computing device 410 can also include a network interface used to communicate with one or more remote computing devices (e.g. server 430) over the network 440. The network interface can include any suitable components for interfacing with one more networks, including for example, transmitters, receivers, ports, controllers, antennas, or other suitable components.

The system 400 includes a server 430, such as a web server. The server 430 can host or be in communication with a geographic information system. The server 430 can be implemented using any suitable computing device(s). The server 430 can have one or more processors 432 and memory 434. The memory 434 can store instructions 436 and data 438. The server 430 can also include a network interface used to communicate with computing device 410 over the network 440. The network interface can include any suitable components for interfacing with one more networks, including for example, transmitters, receivers, ports, controllers, antennas, or other suitable components.

The network 440 can be any type of communications network, such as a local area network (e.g. intranet), wide area network (e.g. Internet), cellular network, or some combination thereof. The network 440 can also include a direct connection between a computing device 410 and the server 430. In general, communication between the server 430 and a computing device 410 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of displaying imagery of a geographic area, comprising:
    providing for display, by one or more computing devices, imagery of a geographic area at a first zoom level;
    detecting, by the one or more computing devices, a continuous zoom event at the first zoom level;
    in response to detecting the continuous zoom event to zoom in from the first zoom level, providing for display at the first zoom level, by the one or more computing devices, an interface element including a first set of geographic labels of the imagery, and in response to detecting the continuous zoom event to zoom out from the first zoom level, providing for display at the first zoom level, by the one or more computing devices, the interface element including a second set of geographic labels of the imagery, each geographic label associated with a different zoom level of the imagery, the plurality of geographic labels displayed within the interface element in order of the zoom level associated with each geographic label, each geographic label providing a description of a geographic area corresponding to the zoom level associated with the geographic label;
    receiving, by the one or more computing devices, data indicative of a user interaction selecting one of the plurality of geographic labels in the interface element as a selected geographic label; and
    in response to receiving the data indicative of the user interaction with the interface element, zooming, by the one or more computing devices, the imagery of the geographic area to a second zoom level corresponding to the selected geographic label.

2. The computer-implemented method of claim 1, wherein the method further comprises providing, by the one or more computing devices, a zoom interface for display in conjunction with the imagery of the geographic area.

3. The computer-implemented method of claim 2, wherein the continuous zoom event is detected, by the one or more computing devices, based at least in part on data indicative of a user interaction with the zoom interface.

4. The computer-implemented method of claim 2, wherein the interface element is provided for display, by the one or more computing devices, adjacent to the zoom interface.

5. The computer-implemented method of claim 1, wherein the interface element is not provided for display, by the one or more computing devices, prior to detecting, by the one or more computing devices, the continuous zoom event.

6. The method of claim 1, wherein the continuous zoom event is associated with receiving multiple zoom requests without interruption over a time period.

7. The method of claim 1, wherein detecting, by the one or more computing devices, the continuous zoom event comprises receiving, by the one or more computing devices, data indicative of a plurality of zoom requests over a defined time period.

8. The method of claim 1, wherein detecting, by the one or more computing devices, the continuous zoom event comprises receiving, by the one or more computing devices, data indicative of three or more zoom requests over a time period of five seconds or less.

9. The method of claim 1, wherein the method comprises identifying, by the one or more computing devices, the plurality of geographic labels for the interface element.

10. The method of claim 9, wherein the plurality of geographic labels for the interface element are identified, by the one or more computing devices, based at least in part on a zoom direction associated with the continuous zoom event.

11. The method of claim 1, wherein the second zoom level is separated from the first zoom level by one or more intermediate zoom levels.

12. The method of claim 11, wherein at least a portion of the data associated with the one or more intermediate zoom levels is not rendered by the one or more computing devices, when zooming, by the one or more computing devices, the imagery of the geographic area to the second zoom level corresponding to the selected geographic label.

13. The method of claim 1, wherein the plurality of geographic labels are text labels.

14. A computing system, comprising: a display device, one or more processors; and
one or more memory devices, the one or more memory devices storing computer-readable instructions that when executed by the one or more processors, cause the one or more processors to perform operations, the operations comprising:
providing for display on the display device imagery of a geographic area at a first zoom level;
detecting a continuous zoom event, the continuous zoom event causing the display device to display the imagery of the geographic area at an intermediate zoom level between the first zoom level and a second zoom level;
in response to detecting the continuous zoom event to zoom in from the first zoom level, providing for display on the display device an interface element at the first zoom level including a first set of geographic labels of the imagery, and in response to detecting the continuous zoom event to zoom out from the first zoom level, providing for display on the display device the interface element at the first zoom level including a second set of geographic labels of the imagery, each geographic label associated with a different zoom level of the imagery, the plurality of geographic labels displayed within the interface element in order of the zoom level associated with each geographic label, each geographic label providing a description of a geographic area corresponding to the zoom level associated with the geographic label;
receiving data indicative of a user interaction selecting one of the plurality of geographic labels in the interface element as a selected geographic label; and
in response to receiving the data indicative of the user interaction with the interface element, zooming the imagery of the geographic area to the second zoom level corresponding to the selected geographic label.

15. The system of claim 14, the continuous zoom event is detected when a plurality of zoom requests are received over a defined time period.

16. The system of claim 14, wherein the operations further comprise identifying the plurality of geographic labels for the interface element, the geographic labels being identified based at least in part on a zoom direction associated with the continuous zoom event.

17. The system of claim 14, wherein the second zoom level is separated from the first zoom level by one or more intermediate zoom levels, wherein at least a portion of data associated with the one or more intermediate zoom levels is not rendered on the display device when zooming the imagery of the geographic area to the second zoom level.

18. One or more tangible, non-transitory computer-readable media storing computer-readable instructions that when executed by one or more processors cause the one or more processors to perform operations, the operations comprising:
providing for display imagery of a geographic area at a first zoom level; providing a zoom interface for display in conjunction with the imagery of the geographic area;
detecting a continuous zoom event based at least in part on data indicative of a user interaction with the zoom interface, and providing for display the imagery of the geographic area at an intermediate zoom level between the first zoom level and a second zoom level in response to the continuous zoom event;
in response to detecting the continuous zoom event to zoom in from the first zoom level, providing for display the zoom interface and an interface element at the first zoom level including a first set of geographic labels of the imagery, and in response to detecting the continuous zoom event to zoom out from the first zoom level, providing for display the interface element at the first zoom level including a second set of geographic labels of the imagery, each geographic label associated with a different zoom level of the imagery, the plurality of geographic labels displayed within the interface element in order of the zoom level associated with each geographic label, each geographic label providing a description of a geographic area corresponding to the zoom level associated with the geographic label;
receiving data indicative of a user interaction selecting one of the plurality of geographic labels in the interface element as a selected geographic label; and
in response to receiving the data indicative of the user interaction with the interface element, zooming the imagery of the geographic area to the second zoom level corresponding to the selected geographic label.

19. The one or more tangible non-transitory computer-readable media of claim 18, wherein the continuous zoom event is detected based at least in part on data indicative of three or more user interactions with the zoom interface over a time period of five seconds or less.

20. The one or more tangible non-transitory computer-readable media of claim 18, the interface element is not provided for display in conjunction with the zoom interface prior to detecting the continuous zoom event.

\* \* \* \* \*

UNITED STATES PATENT AND TRADEMARK OFFICE
CERTIFICATE OF CORRECTION

PATENT NO. : 10,198,164 B1
APPLICATION NO. : 14/833256
DATED : February 5, 2019
INVENTOR(S) : Bailiang Zhou and Patrick Hofmann Page 1 of 1

It is certified that error appears in the above-identified patent and that said Letters Patent is hereby corrected as shown below:

On the Title Page

Item (22), Filed: please delete "Aug. 31,2015" and insert --Aug. 24, 2015--

Signed and Sealed this
Second Day of April, 2019

Andrei Iancu
*Director of the United States Patent and Trademark Office*